L. G. GREEN.
SPRING LUBRICATING DEVICE.
APPLICATION FILED FEB. 1, 1917.

1,277,911.

Patented Sept. 3, 1918.

INVENTOR
Louis G. Green.
BY Niedersheim Fairbanks
ATTORNEYS

UNITED STATES PATENT OFFICE.

LOUIS G. GREEN, OF PHILADELPHIA, PENNSYLVANIA.

SPRING-LUBRICATING DEVICE.

1,277,911. Specification of Letters Patent. Patented Sept. 3, 1918.

Application filed February 1, 1917. Serial No. 145,880.

*To all whom it may concern:*

Be it known that I, LOUIS G. GREEN, a a citizen of the United States, residing in the city and county of Philadelphia, State of Pennsylvania, have invented a new and useful Spring-Lubricating Device, of which the following is a specification.

My present invention relates to a spring lubricating device, wherein each leaf of the spring, except an outer leaf, is provided with a groove extending to and opening through the end of its respective spring, whereby any sediment, rust or foreign material that may at any time stop up and clog the channels or grooves can readily be removed by the insertion of a wire or similar device.

It further consists of a novel construction of a spring lubricating device, wherein the grease cup or container for the lubricant is connected with the U-bolt or spring clip employed to retain the leaves of the spring in assembled position, and all of the leaves, except one of the outer leaves, are provided with holes which communicate with the grease cup and also with the grooves formed in the faces of the leaves.

It further consists of a novel construction of a spring lubricating device, which is carried by and forms a part of a U-bolt or spring clip and wherein the grease cup is assembled in such a manner that it does not interfere with the placing of a rubber bumper, or shock absorber in its accustomed place at the center of the spring.

Other novel features of construction and advantage will hereinafter more clearly appear in the detailed description of my invention and the appended claims.

For the purpose of illustrating my invention I have shown in the accompanying drawings a typical embodiment of it, which is at present preferred by me, since this embodiment will give in practice satisfactory and reliable results, although it is to be understood that the various instrumentalities of which my invention consists can be variously arranged and organized and that my invention is not limited to the precise arrangement and organization of these instrumentalities as herein shown and described.

Similar numerals of reference indicate corresponding parts in the figures.

Figure 1:
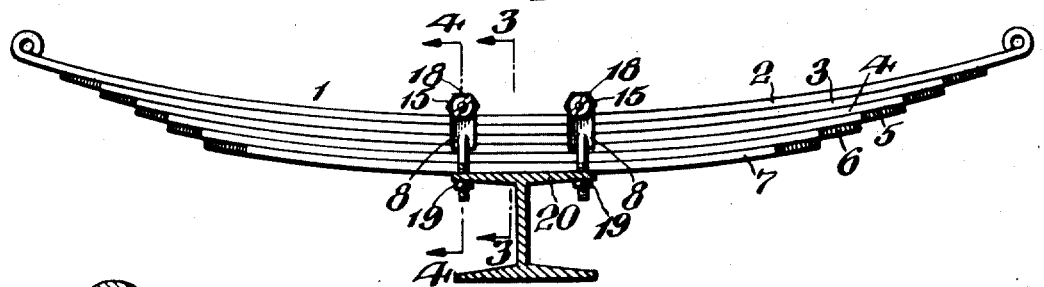
Figure 1 represents, in side elevation, a spring in conjunction with which a lubricating device embodying my invention is employed.
Figure 2:
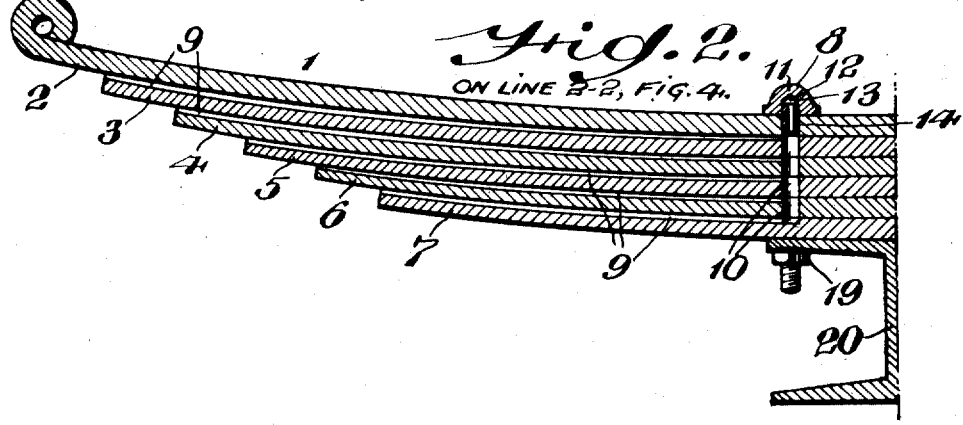
Fig. 2 represents a section on line 2—2 of Fig. 4.
Figure 3:
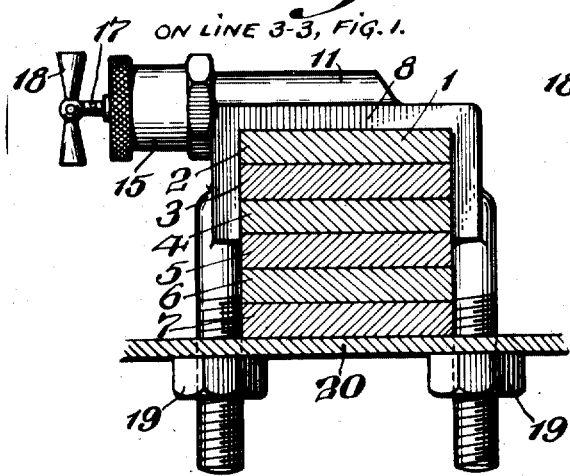
Fig. 3 represents a section on line 3—3 of Fig. 1.
Figure 4:
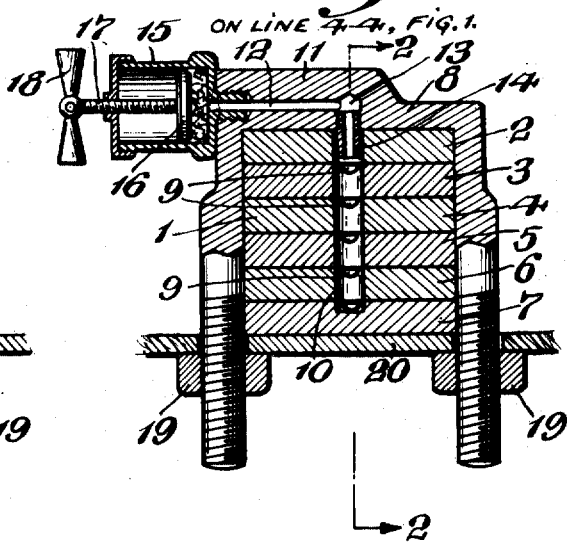
Fig. 4 represents a section on line 4—4 of Fig. 1.

Referring to the drawings, 1 designates a laminated spring of any desired or conventional type and provided with any desired number of leaves. In the embodiment shown, the spring consists of the leaves 2, 3, 4, 5, 6 and 7 which are retained in assembled position by means of the U-bolts or spring clips 8 which are of novel construction. Each leaf spring except one of the outer leaves is provided on each side of its center with a groove 9 which extends to the end of the spring and each set of grooves communicates with an aperture 10 in each of the leaf springs. Each U-bolt is provided at its base portion with an enlargement 11 in which is located a laterally extending aperture 12 which opens through its side. This aperture 12 communicates with an aperture 13 which is centrally located, and in threaded engagement with the walls of this aperture is a bushing 14 which extends outwardly from the body portion of the U-bolt and into the aperture 10 of the leaf spring 2. 15 designates a conventional type of a grease cup or container for the lubricant which consists of a casing adapted to contain the lubricant and provided with a plunger 16, the position of which is adjusted by means of the screw 17 operatively connected therewith and in threaded engagement with the container 15. The screw 17 is provided with an actuating handle 18. The U-bolt 8 has its free end threaded and provided with nuts 19 which bear against the flange of the axle 20 or the body portion of the wheel when the spring is inverted.

It will be seen that in accordance with my present invention, no change in the general manufacture of the spring structure is necessary, except the provision of the grooves and necessary apertures, and it will be understood that my invention is adapted to be employed with any type of laminated spring and can be used with a full, three-quarter, semi and quarter elliptic spring. It will be seen that the lubricant can freely pass through the apertures 12 and 13, the apertures 10, and through the channels formed by the grooves 9, and that these channels 9 extend completely through the end of the leaves. This enables one to at any time remove any sediment, rust or foreign material which accumulates in the grooves 9 without necessitating taking the spring apart. It is to be understood that the spring clips on each side of the center of the spring are preferably each constructed in a similar manner and communicate with grooves or channels which are directed in opposite directions so that the entire spring is properly lubricated. The grooves in the spring may be formed in any desired manner and will preferably be formed therein during the process of manufacture of the leaves. Attention is also directed to the fact that in accordance with my present invention the U-bolt or spring clips are not weakened in construction since the body portion is provided with an enlargement and the grease cup is located only at one side of the spring clip so that it will not interfere in any manner with the employment of a bumper or shock absorber such as is sometimes employed in devices of this character. The grooves are preferably centrally located on the leaves and each leaf except one of the outer leaves is provided with an aperture 10 therethrough and each leaf except one of the outer leaves is provided with grooves.

It will now be apparent that I have devised a novel and useful spring lubricating device which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A leaf spring comprising a plurality of leaves having registering apertures, each leaf having a groove extending from its aperture to the extreme end of the leaf, a clip having an aperture arranged to communicate with said registering apertures, a grease cup secured to said clip and communicating with its aperture, and means to secure said clip in assembled position with respect to the leaf spring.

2. A leaf spring comprising a plurality of leaves having registering apertures, each leaf having a groove extending from its aperture to the extreme end of the leaf, a clip having an aperture arranged to communicate with said registering apertures, a grease cup secured to the side of said clip and communicating with its aperture, and means to secure said clip in assembled position with respect to the leaf spring.

3. A leaf spring comprising a plurality of leaves having registering apertures on opposite sides of the center of the spring, each leaf having grooves extending from its apertures to the extreme ends of the leaf, spring clips on opposite sides of the center of said spring, each having an aperture arranged to communicate with a set of registering apertures of the leaves, and a grease cup secured to the side of each spring clip and communicating with its aperture.

4. The combination with a support, of a leaf spring comprising a plurality of leaves having registering apertures on opposite sides of the center of the spring, certain of said leaves each having grooves extending from its apertures to the ends of the leaf, U-bolts having their body portions enlarged and provided with laterally extending apertures, said U-bolts having bushings adapted to enter the apertures of one of the outer leaves and communicating with said laterally extending apertures, said support being adapted to receive the ends of said U-bolts, and nuts on the free ends of said U-bolts to maintain the parts in assembled position.

5. A leaf spring comprising a plurality of leaves having registering apertures on opposite sides of the center of the spring, certain of said leaves having grooves extending from their apertures to the extreme ends of the leaves, spring clips on opposite sides of the center of said spring each having an aperture arranged to communicate with a set of registering apertures of the leaves, and means to pass lubricant to said apertures.

LOUIS G. GREEN.

Witnesses:
H. S. FAIRBANKS,
C. D. McVAY.